United States Patent
Tonelli et al.

(10) Patent No.: US 8,304,515 B2
(45) Date of Patent: Nov. 6, 2012

(54) PROCESS FOR THE PURIFICATION OF POLYOL PFPE DERIVATIVE

(75) Inventors: Claudio Tonelli, Sesto San Giovanni (IT); Graziano Giuseppe Vezzulli, Milan (IT); Rosaldo Picozzi, Cesate (IT); Piero Gavezotti, Milan (IT)

(73) Assignee: Solvay Solexis S.p.A., Bollate (MI) (IT)

( * ) Notice: Subject to any disclaimer, the term of this patent is extended or adjusted under 35 U.S.C. 154(b) by 249 days.

(21) Appl. No.: 12/921,844

(22) PCT Filed: Mar. 13, 2009

(86) PCT No.: PCT/EP2009/052999
§ 371 (c)(1),
(2), (4) Date: Sep. 10, 2010

(87) PCT Pub. No.: WO2009/112578
PCT Pub. Date: Sep. 17, 2009

(65) Prior Publication Data
US 2011/0003968 A1    Jan. 6, 2011

(30) Foreign Application Priority Data
Mar. 14, 2008   (EP) .................................... 08152770

(51) Int. Cl.
*C08F 6/00* (2006.01)
(52) U.S. Cl. ........ 528/493; 528/480; 528/491; 528/502; 528/397; 528/401; 526/71; 526/77; 526/242; 526/247; 521/40; 521/46
(58) Field of Classification Search .................. 528/397, 528/401, 480, 491, 493, 494, 495, 497, 502 A, 528/502 E; 526/71, 77, 242, 247; 521/40, 521/46
See application file for complete search history.

(56) References Cited

U.S. PATENT DOCUMENTS

| 5,910,614 | A * | 6/1999 | Turri et al. .................. 568/615 |
| 2003/0100454 | A1 | 5/2003 | Osawa et al. |
| 2004/0092406 | A1 | 5/2004 | Osawa et al. |
| 2007/0298982 | A1 | 12/2007 | Shimokawa |

FOREIGN PATENT DOCUMENTS

| EP | 0822216 A2 | 2/1998 |
| EP | 1372141 A1 | 12/2003 |
| JP | 2003041279 A | 2/2003 |

OTHER PUBLICATIONS

Turri, Stefano, et al—"End Group Chemistry of Fluoro-Oligomers: Highly Selective Syntheses of Diepoxy, Diallyl, and Tetraol Derivatives", Journal of Polymer Science, Part A, Polym. Chem., 1996, vol. 34, p. 3263-3275, John Wiley & Sons, Inc.; 13 pgs.

Scicchitano, Massimo, et al—"Synthesis and characterization of low-viscosity fluoropolyether-based segmented oligomers", Die Angewandte Makromoleculare Chemie, 1995, vol. 231, No. 4000, p. 47-60; 14 pgs.

* cited by examiner

*Primary Examiner* — Frances Tischler
(74) *Attorney, Agent, or Firm* — Xuping Fu

(57) ABSTRACT

A process for the purification of a tetraol PFPE derivative [tetraol (T)] of formula (I): $HO-CH_2-CH(OH)-CH_2-O-CH_2-CF_2-O-R_f-CF_2-CH_2O-CH_2-CH(OH)-CH_2OH$, wherein $R_f$ represents a fluoropolyoxyalkene chain (chain $R_f$), from a mixture (M) of hydroxyl (per)fluoropolyether derivatives, said mixture comprising said tetraol (T) and at least one hydroxyl (per)fluoropolyether [PFPE (OH)] comprising a chain $R_f$ terminated with at least one end group of formula: $-CF_2CH_2OH$; $-CF_2CH_2O-CH(OH)-CH_2-O-CH_2-CH(OH)-CH_2OH$; said process comprising: step 1: reacting the mixture (M) with ketones and/or aldehydes so as to selectively protect couples of hydroxyl groups on vicinal carbon atoms by forming corresponding cyclic ketal/acetal derivatives, so as to yield a protected mixture (P); step 2: reacting residual hydroxyl groups of the mixture (P) with suitable functionalizing agents enabling substantial volatility modification, so as to obtain a functionalized protected mixture $(P_f)$; step 3: fractional distillation of the mixture $(P_f)$ so as to isolate the cyclic acetal/ketal derivatives of tetraol (T); and step 4: hydrolyzing the acetal/ketal derivatives of tetraol (T) so as to recover pure tetraol (T).

10 Claims, No Drawings

PROCESS FOR THE PURIFICATION OF POLYOL PFPE DERIVATIVE

CROSS-REFERENCE TO RELATED APPLICATIONS

The present patent application is a U.S. national stage application under 35 U.S.C. §371 of International Application No. PCT/EP2009/052999 filed Mar. 13, 2009 which claims the benefit of the European patent application No. 08152770.7 filed on Mar. 14, 2008, the whole content of this application being incorporated herein by reference for all purposes.

TECHNICAL FIELD

The invention pertains to a process for the purification of polyol PFPE compounds useful as lubricants for magnetic media.

BACKGROUND ART

As well known, magnetic recording apparatus is divided into those using a magnetic disk as the medium on which to record data and those using magnetic tape as such medium. Because the former type of recording apparatus using a magnetic disk (hereinafter referred to as magnetic disk drives) is prevailing, the following description focuses on magnetic disk drives as an example of the magnetic recording apparatus.

As the capacity enlargement of magnetic disk drives has been pursued for recent years, the fly height of the magnetic head has been lowered rapidly down to below 30 nm, and, consequently, there is increasing need for reliability in terms of resistance to sliding friction.

Also, there is strong need to enhance the data processing speed with more disk capacity. In particular, in a Redundant Array of Independent Disks (RAID) system, a magnetic disk drive that operates at a disk revolving speed of 10,000 rmp or higher is required.

In order to ensure the reliability of a magnetic disk drive, generally, a lubricant layer is formed on a carbon overcoat on the surface of a magnetic disk for use in the disk drive. As the main material of the lubricant layer, usually, fluoropolyether, which is a chemically stable fluorinated organic compound, is widely used.

Actually, in order to assure reliability of the magnetic disk drive, it is mandatory to efficiently preserve suitable lubricant distribution on the surface of said magnetic disk drive for long operating times. When magnetic disk drives operate, said disk revolves at a high speed and the lubricant might be spun off by the combined action of the air shear due to the air flow on the surface of the disk as the disk revolves, and of the centrifugal force directly exerted on the lubricant. As a consequence, it is often observed that the quantity of the lubricant on the surface of the disk gradually decreases. Also, evaporation phenomena of the lubricant into the atmosphere inside the magnetic drive may take place.

To overcome this problem of the lubricant loss by being spun off during disk revolution and natural evaporation, approaches have heretofore been proposed. Thus, a method for restraining the lubricant from being spun off and evaporated has been proposed in which the adhesion force of the lubricant to the disk protecting layer is made stronger by increasing the polarity of the functional end groups in the lubricant. Said polar end groups are believed to improve adherence of the lubricant to the surface of the magnetic media.

Within this approach, fluoropolyether lubricants based on fluoropolyethers as the backbone and having hydroxyl functional groups as their end groups have shown best performances.

A class of compounds which have been found to plenty fulfil requirements for being use as magnetic media lubricant are fluoropolyether tetraols of general formula: HO—CH$_2$—CH(OH)—CH$_2$—O—CH$_2$—CF$_2$—R$_f$—CF$_2$CH$_2$O—CH$_2$—CH(OH)—CH$_2$OH, comprising a fluoropolyoxyalkene chain (R$_f$) having at its end two diols groups.

Such materials can be notably manufacture by reaction of epihalohydrins with perfluoropolyether derivatives having two hydroxyl end-group (see Scheme 1 here below), as taught in TURRI, Stefano, et al. End Group Chemistry of Fluoro-Oligomers: Highly Selective Synthese of Diepoxy, Diallyl, and Tetraol Derivatives. (A) *J. polym. sci, A, Polym. chem.* 1996, vol. 34, p. 3263-3275.

Scheme 1

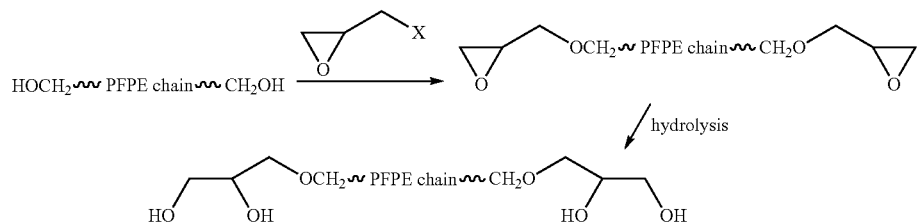

Nevertheless, side reactions are likely to occur during nucleophilic substitution on the epihalohydrin, involving e.g. reactions of oxirane ring with further PFPE hydroxyl derivatives, yielding materials comprising more than one PFPE chain block. Final material thus fails to comply with the expected stoichiometry and fails to possess the targeted anchoring diol functions as end-chains.

Similarly, reaction of perfluoropolyether derivatives having two hydroxyl end-group with glycidol of formula:

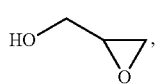

as described in SCHICCHITANO, Massimo, et al. Synthesis and characterization of low-viscosity fluoropolyether-based segmented oligomers. *Die Angewandte Makromoleculare*

*Chemie.* 1995, vol. 231, no. 4000, p. 47-60., yields, in addition to the expected epoxy-substituted derivatives (which can be further converted in corresponding diols), a large range of side-products. As an example, PFPE hydroxyl derivatives can open the oxirane ring of the targeted compound, yielding materials comprising more than one PFPE chain block, and/or, more frequently, a further glycidol molecule can react with the epoxide ring of above mentioned targeted epoxy-substituted intermediate, so that different species are formed.

Mixtures obtained from processes of the prior art are thus generally complex compositions comprising unreacted precursors, targeted polyol derivatives and polymeric material comprising several PFPE chain blocks and/or several ex-glycidol molecules moieties.

Also, the broad molecular weight distribution of the starting perfluoropolyether diol mixture used for manufacturing corresponding tetraol derivatives by reaction with glycidol and/or epihalohydrins as above detailed makes it even more difficult to separate materials based on their respective volatility, as this parameter is both affected by the molecular weight and the functionality degree of the end chains.

Complex purification procedures, based e.g. on supercritical carbon dioxide extraction techniques are thus required for purifying target material, so as to achieve the expected chemical structure and level of functionality at the end groups.

Approaches of this type are described, for instance, in US 2004092406 (FUJI ELECTRIC CO LTD (JP)) 13 May 2004, in US 2003100454 (FUJI ELECTRIC CO LTD (JP)) 29 May 2003 and EP 1372141 A (HITACHI LTD (JP)) 17 Dec. 2003.

Efficiency of these processes is relatively low and waste of highly costly material non negligible. Also said purification steps generate additional burden on manufacturers or users of products obtained as above detailed.

Due to the extreme wear conditions wherein said lubricants are to be used in particular for hard disks lubrication, it is essential to use absolutely pure compounds, which have homogeneous behaviour and do not undergo risks of evaporative loss.

The need was thus felt in the art for a process for the purification of hydroxyl functional perfluoropolyether derivatives having improved yield towards targeted compounds having two vicinal hydroxyl groups, lower energy consumption and simpler operations, which could provide high purity (per)fluoropolyether tetraols.

DISCLOSURE OF INVENTION

It is thus an object of the present invention a process for the purification of a tetraol PFPE derivative [tetraol (T)] of formula (I):

HO—CH$_2$—CH(OH)—CH$_2$—O—CH$_2$—CF$_2$—O—R$_f$—CF$_2$—CH$_2$O—CH$_2$—CH(OH)—CH$_2$OH    (I), wherein R$_f$ represents a fluoropolyoxyalkene chain (chain R$_f$), i.e. a fluorocarbon segment comprising ether linkages in main chain, from a mixture of hydroxyl (per)fluoropolyether derivatives [mixture (M)], said mixture comprising said tetraol (T) and at least one hydroxyl (per)fluoropolyether [PFPE (OH)] comprising a chain R$_f$ terminated with at least one end group of formula:

—CF$_2$CH$_2$OH; —CF$_2$CH$_2$O—CH(OH)—CH$_2$—O—CH$_2$—CH(OH)—CH$_2$OH;

said process comprising:

step 1: reacting the mixture (M) with ketones and/or aldehydes so as to selectively protect couples of hydroxyl groups on vicinal carbon atoms by forming corresponding cyclic ketal/acetal derivatives, so as to yield a protected mixture [mixture (P)];

step 2: reacting residual hydroxyl groups of the mixture (P) with suitable functionalizing agents enabling substantial volatility modification, so as to obtain a functionalized protected mixture [mixture (P$_f$)];

step 3: fractional distillation of the mixture (P$_f$) so as to isolate the cyclic acetal/ketal derivatives of tetraol (T);

step 4: hydrolyzing the acetal/ketal derivatives of tetraol (T) so as to recover pure tetraol (T).

The applicant has found that by means of the process of the invention it is advantageously possible to successfully isolate in high yields (exceeding 85%) tetraol (T) with high level of purity (exceeding 99%).

Mixture (M) generally comprises a mixture of hydroxyl (per)fluoropolyether derivative(s) and tetraol (T) complying with formula:

$T_1$-O—$R_f$-$T_2$ wherein:

R$_f$ is a fluoropolyoxyalkene chain; and
T$_1$ and T$_2$ are selected among the following groups:
(t1) —CF$_2$—CH$_2$O—CH$_2$—CH(OH)—CH$_2$OH;
(t2) —CF$_2$CH$_2$OH;
(t3) —CF$_2$CH$_2$O—CH(OH)—CH$_2$—O—CH$_2$—CH(OH)—CH$_2$OH, with the provisio that the mixture (M) comprise at least one compound wherein T$_1$=T$_2$=t1 (i.e. a tetraol (T)) and at least one hydroxyl (per)fluoropolyether with at least one of T$_1$ and T$_2$ different from t1 (i.e. a PFPE (OH)).

Typically, composition of mixture (M), as determined notably by $^1$H-NMR on corresponding derivative obtained from derivatization with trifluoroacetic anhydride, is such that the mixture (M) comprises:

from 60 to 90% moles of groups (t1) as above detailed;
from 5 to 20% moles of groups (t2) as above detailed;
from 5 to 20% moles of groups (t3) as above detailed.

The fluoropolyoxyalkene chain (R$_f$) of the PFPE (OH) and of the tetraol (T), equal or different from each other and at each occurrence, is preferably a chain comprising repeating units R°, said repeating units being chosen among the group consisting of:

(i) —CFXO—, wherein X is F or CF$_3$,
(ii) —CFXCFXO—, wherein X, equal or different at each occurrence, is F or CF$_3$, with the provision that at least one of X is —F,
(iii) —CF$_2$CF$_2$CF$_2$O—,
(iv) —CF$_2$CF$_2$CF$_2$CF$_2$O—,
(v) —(CF$_2$)$_j$—CFZ—O— wherein j is an integer from 0 to 3 and Z is a group of general formula —OR$_f'$T$_3$, wherein R$_f'$ is a fluoropolyoxyalkene chain comprising a number of repeating units from 0 to 10, said recurring units being chosen among the followings: —CFXO—, —CF$_2$CFXO—, —CF$_2$CF$_2$CF$_2$O—, —CF$_2$CF$_2$CF$_2$CF$_2$O—, with each of each of X being independently F or CF$_3$. and T$_3$ being a C$_1$-C$_3$ perfluoroalkyl group.

Thus, the mixture (M) preferably comprises hydroxyl (per)fluoropolyether derivatives and tetraols (T) complying with formula here below:

T$_2$-O—(CFX$^1$O)$_{c1}$(CFX$^2$CFX$^3$O)$_{c2}$(CF$_2$CF$_2$CF$_2$O)$_{c3}$(CF$_2$CF$_2$CF$_2$CF$_2$O)$_{c4}$-T$_1$ wherein
X$^1$, X$^2$, X$^3$ equal or different from each other and at each occurrence are independently —F, —CF$_3$;
T$_1$ and T$_2$ are as above defined;
c1, c2, c3, and c4, equal or different from each other, are independently integers ≧0, such that and c1+c2+c3+c4 is in the range 5 to 2000, preferably between 10 and 500; should at least two of c1, c2, c3 and c4 be different from zero, the different recurring units are generally statistically distributed along the chain.

Mixture (M) can be notably manufactured by reaction of perfluoropolyether derivatives having two hydroxyl end-group with epihalohydrins, as taught in TURRI, Stefano, et al. End Group Chemistry of Fluoro-Oligomers: Highly Selective Synthese of Diepoxy, Diallyl, and Tetraol Derivatives. (A) *J. polym. sci, A, Polym. chem.* 1996, vol. 34, p. 3263-3275. or with glycidol of formula:

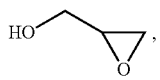

as described in SCHICCHITANO, Massimo, et al. Synthesis and characterization of low-viscosity fluoropolyether-based segmented oligomers. *Die Angewandte Makromoleculare Chemie.* 1995, vol. 231, no. 4000, p. 47-60.

Step 1 is advantageously carried out by contacting the mixture (M) with an aldehyde or a ketone in the presence of a protic acid.

The choice of the aldehyde or ketone is not critical, provided that it selectively reacts with vicinal hydroxyl groups for providing corresponding cyclic acetal/ketal.

Among suitable aldehydes and ketones, mention can be made of acetone, methyl ethyl ketone cyclohexanone, phenylmethylketone, acetaldehyde.

As protic acid, mention can be notably made of p-toluensulfonic acid, of acetic acid, or sulphuric acid.

The reaction is advantageously carried out in the presence of a suitable solvent able to at least partially solubilise both the mixture (M), the aldehyde or ketone and the protic acid.

Among suitable solvents mention can be made of ketones, esters, aprotic polar solvents, hydrocarbons, aromatics or their mixtures. Examples of these are acetone, methyl ethyl ketone, butyl acetate, dimethylformamide (DMF), toluene, petroleum ether, hexane The increased stability of 5-membered cyclic acetal/ketal structure formed by reaction of vicinal hydroxyl groups (i.e. from hydroxyl groups in 1,2 relative position) with aldehydes/ketones advantageously provides for high selectivity of protection of said hydroxyl groups, with respect to isolated or distal hydroxyl groups.

Thus, among above mentioned end groups of hydroxyl (per)fluoropolyether derivatives and tetraols (T), it has been found that reactivity of groups t1 and t3 as above detailed advantageously yields in step 1 protected or hemi-protected end-groups, whereas t2 remains unreacted in same conditions, as detailed in following scheme:

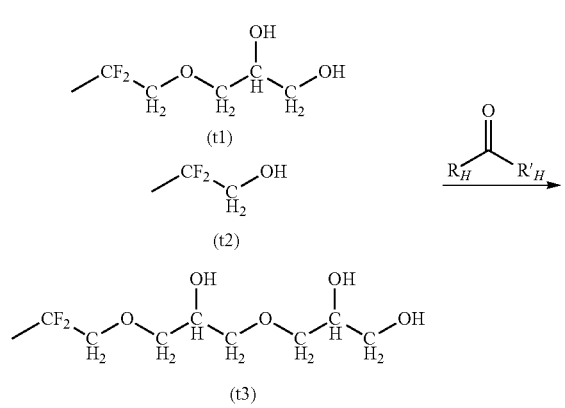

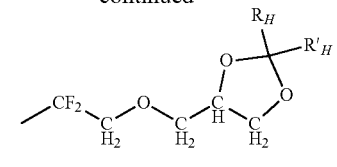

(pt1)

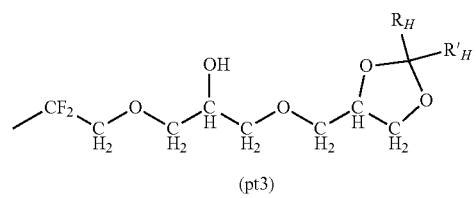

wherein $R_H$ and $R'_H$, equal or different from each other, are independently selected among H and $C_1$-$C_{12}$ hydrocarbon group, with the provisio that at least one of $R_H$ and $R'_H$ is different from H.

Thus the protected mixture or mixture (P) generally comprises a mixture of at least partially protected hydroxyl (per) fluoropolyether derivatives and protected tetraols (T) complying with formula:

$$T'_1\text{-}O\text{---}R_f\text{-}T'_2$$

wherein:

$R_f$ is a fluoropolyoxyalkene chain, as above detailed; and
$T'_1$ and $T'_2$ are selected among the following groups:
(pt1)

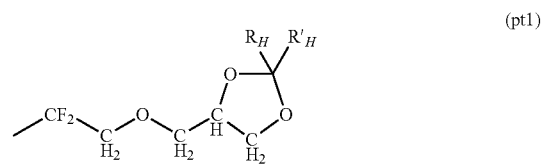

(t2) —$CF_2CH_2OH$;
(pt3)

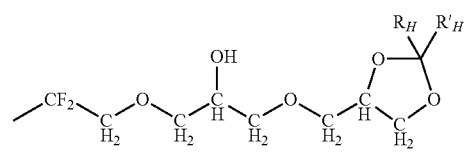

wherein $R_H$ and $R'_H$, equal or different from each other, are independently selected among H and $C_1$-$C_{12}$ hydrocarbon group, at least one of $R_H$ and $R'_H$ being different from H, with the provisio that the mixture (P) comprise at least one compound wherein $T'_1$=$T'_2$=pt1 (i.e. a protected tetraol (T)) and at least one optionally partially protected hydroxyl (per)fluoropolyether with at least one of $T'_1$ and $T'_2$ different from pt1.

In step 2, residual hydroxyl groups of the mixture (P) are made to react with suitable functionalizing agents enabling substantial volatility modification, so as to obtain a functionalized protected mixture [mixture ($P_f$)].

Generally, in step 2, reactivity of end groups t2 and pt3 of mixture (P) as above detailed yields functionalized or hemi-functionalized end-groups for compounds different from tetraol (T), while group pt1 remains unreacted in same conditions, as detailed in following scheme:

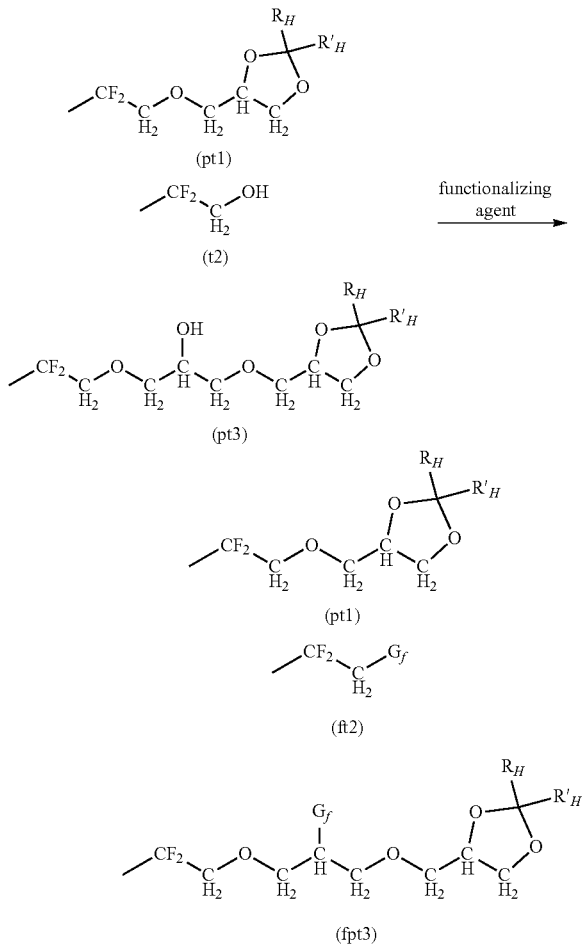

wherein $R_H$ and $R'_H$ have the same meaning as above defined and $G_f$ is a functional group enabling substantial volatility modification, optionally bond at its distal end to another (ft2) or (fpt3) group.

The functionalized protected mixture or mixture ($P_f$) generally comprises a mixture of functionalized, optionally partially protected, hydroxyl (per)fluoropolyether derivatives and protected tetraols (T) complying with formula:

T''$_1$—O—R$_f$-T''$_2$ wherein:
R$_f$ is a fluoropolyoxyalkene chain, as above detailed; and
T''$_1$ and T''$_2$ are selected among the following groups:
(pt1)

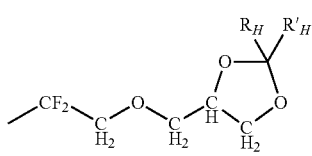

(ft2) —CF$_2$CH$_2$G$_f$;
(pt3)

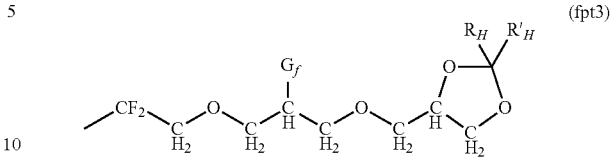

wherein $R_H$, $R'_H$ and $G_f$ have the same meaning as above defined, with the provisio that the mixture ($P_f$) comprises at least one compound wherein T''$_1$=T''$_2$=pt1 (i.e. a protected tetraol (T)) and at least one (per)fluoropolyether with at least one of T''$_1$ and T''$_2$ different from pt1.

Among suitable methods for functionalizing residual hydroxyl group mention can be made of esterification reactions, reactions with carbonate monomers (like for example, biphenyl carbonate or dimethyl carbonate) to yield corresponding mono-, bis- or poly-carbonates, or reactions with substrates able to act as electrophiles in Williamson-like reactions (ether linkage formation), e.g. with α-ω-dihaloalkanes, to yield corresponding di- or poly-ether compounds.

It is nevertheless generally preferred to functionalize said residual hydroxyl groups by conversion in corresponding esters moieties, via reaction with suitable carbonyl derivatives (acyl halides, anhydrides, acids).

The choice if carbonyl derivative is not particularly limited. Preferred will be those carbonyl derivatives able to provide esters having high thermal stability, in particular able to withstand temperatures as high as 200-250° C., such as those applied during fractional distillation in step 3.

Among mono-carbonyl derivatives, mention can be notably made of:
organic fatty acids of formula R$_a$—COOH, with R$_a$ being an aliphatic C$_{8-36}$ group;
(per)fluoropolyether monoacyl derivatives of formula:

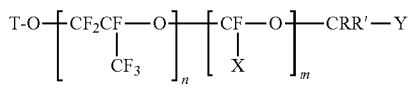

wherein X' is F or CF$_3$; R and R', equal or different from each other are chosen independently among F, Cl, Br; Y is a —C(O)X group, with X=Cl, F, OH; T is a C$_1$-C$_3$ perfluorocarbon group, optionally comprising one halogen atom different from fluorine; n ranges from 1 to 25, with m/n being from 0.01 to 0.5, units being statistically distributed along the chain;
(per)fluoropolyether monoacyl derivatives of formula:

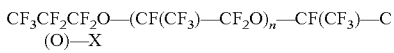

with X=Cl, F, OH and n selected so as the average molecular weight is comprised between 100 and 10 000, preferably from 1 000 and 3 000;
(per)fluoropolyether monoacyl derivatives of formula:

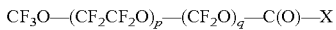

with X=Cl, F, OH and p and q are selected so as the average molecular weight is comprised between 100 and 10 000, preferably from 1 000 and 3 000 with p/q being ≧0.5, units being statistically distributed along the chain.

While monocarbonyl derivatives can be successfully used, it is generally preferred to use dicarbonyl derivatives, in particular those having remote (alpha, omega) carbonyl groups.

Among di-carbonyl derivatives, mention can be notably made of:

organic fatty diacids of formula HOOC—$R_b$—COOH, with $R_b$ being a divalent aliphatic $C_{6-24}$ group;

(per)fluoropolyether diacyl derivatives of formula:

Y—CRR'—O—$(CF_2CF(CF_3)O)_n(CF(X)O)_m$—CRR'Y wherein X' is F or $CF_3$; R and R', equal or different from each other are chosen independently among F, Cl, Br; Y is a —C(O)X group, with X=Cl, F, OH; n ranges from 1 to 25, with m/n being from 0.01 to 0.5, recurring units being statistically distributed along the chain;

(per)fluoropolyether diacyl derivatives of formula:

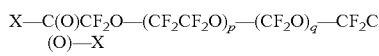
X—$C(O)CF_2O$—$(CF_2CF_2O)_p$—$(CF_2O)_q$—$CF_2C(O)$—X wherein X=Cl, F, OH; p and q are selected so that the average molecular weight is comprised between 100 and 10000, preferably from 1000 and 3000 with p/q being ≧0.5, recurring units being statistically distributed along the chain.

By reaction with said dicarbonyl derivatives, diesters are formed having bound thereto two residues derived from a partially protected hydroxyl (per)fluoropolyether or an unprotected hydroxyl (per)fluoropolyether.

In step 3, the functionalized protected mixture [mixture ($P_f$)] is submitted to a fractional distillation.

As previously mentioned, the functionalization step 2 advantageously substantially modifies the relative volatility of different components of protected mixture (P), so that those components of formula $T''_1$—O—$R_f$-$T''_2$ as above detailed, having at least one of $T''_1$ and $T''_2$ different from pt1, thus bearing a functionalized group $G_f$, have a substantially modified, generally strongly depressed, volatility with respect to protected tetraols (T) having both end groups of formula pt1, as above detailed.

Thus, standard fractional distillation procedure can easily enable separation of the cyclic ketal/acetal derivatives of the tetraol (T).

Among said procedures, mention can be notably made of thin film distillation, generally carried out at reduced pressure.

Light fraction generally consists essentially of cyclic ketal/acetal derivatives of the tetraol (T), while heavy residue generally consists essentially of a mixtures of derivatives of formula $T''_1$—O—$R_f$-$T''_2$ as above detailed, having at least one of $T''_1$ and $T''_2$ different from pt1, i.e. comprising at least one group $G_f$.

In step 4, the cyclic ketal/acetal derivatives of the tetraol (T), as recovered in high purity from step 3, are submitted to hydrolysis so as to yield pure tetraol (T).

Hydrolysis conditions are not particularly limited and are generally chosen as a function of ketal/acetal derivative. Typically, hydrolysis is carried out under acid catalysis. Typically an aqueous or aqueous alcoholic solution of a strong acid (e.g. HCl, $H_2SO_4$, $CH_3COOH$...) is contacted with cyclic ketal/acetal derivatives of the tetraol (T).

Tetraol (T) is finally recovered with high purity from this latter step.

The Applicant has surprisingly found that, despite the multistep procedure, each of above mentioned step proceeds with quantitative conversion and high selectivity, even when the mixture (M) comprises a tetraol (T) having broad molecular weight distribution, so as to obtain in high yields highly pure tetraol (T), which can be used as such in highly demanding lubricating applications, e.g. in magnetic media lubrication.

The present invention will be now described in more detail with reference to the following examples, whose purpose is merely illustrative and not intended to limit the scope of the invention.

EXAMPLE 1

Tetraol 2000 Narrow MWD+Diac 2000

Analysis of Raw Mixture ($M_1$)

A mixture ($M_1$) comprising a tetraol PFPE derivative and other hydroxyl derivatives and having an average molecular weight of 2000 was submitted to NMR analysis as such and after derivatization with trifluoroacetic anhydride. For obtaining derivatized products, 5 g of mixture were treated with 10 g of trifluoroacetic anhydride so as to convert hydroxyl groups into trifluoacetate groups. The excess trifluoroacetic anhydride was removed by distillation under reduced pressure. Results are summarized here below:

$^1$H NMR (neat sample): a complex pattern of signals around 3.3-4.0 ppm (due to —$CH_2$— and —CH(—)— groups, intensity: about 7 H) and a signal at 4.9 ppm (due to the OH groups, intensity: about 2H) were detected.

$^1$H-NMR (freon 113-acetone solution of derivatized sample):

5.7 ppm —CH— group of 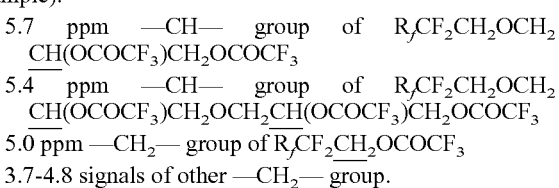 $R_fCF_2CH_2OCH_2$ CH(OCOCF$_3$)CH$_2$OCOCF$_3$ 5.4 ppm —CH— group of 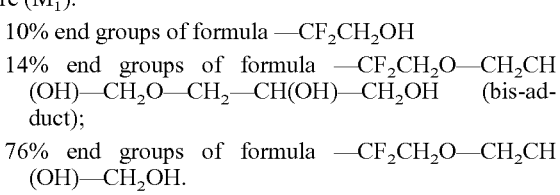 $R_fCF_2CH_2OCH_2$CH(OCOCF$_3$)CH$_2$OCH$_2$CH(OCOCF$_3$)CH$_2$OCOCF$_3$ 5.0 ppm —$CH_2$— group of $R_fCF_2CH_2OCOCF_3$ 3.7-4.8 signals of other —$CH_2$— group.

The analysis yielded the following composition for mixture ($M_1$):

10% end groups of formula —$CF_2CH_2OH$

14% end groups of formula —$CF_2CH_2O$—$CH_2CH(OH)$—$CH_2O$—$CH_2$—$CH(OH)$—$CH_2OH$ (bis-adduct);

76% end groups of formula —$CF_2CH_2O$—$CH_2CH(OH)$—$CH_2OH$.

Its other relevant molecular parameters, as determined by GPC analysis are: average molecular weight=2000, Polydispersity 1.05.

Step 1.1: Protection of Vicinal Hydroxyl Groups

In a 500 ml two necked flask, equipped with a magnetic stirrer, and a total reflux phase-separating head, 300 g of the mixture as above detailed, 110 g (140 ml, 1.9 moles) of acetone, 140 ml of low boiling petroleum ether and 0.12 g sulphuric acid 96% were introduced.

The reaction mixture was refluxed under stirring and the water was removed and collected in an external trap, until formation of water ended (about 10 hours).

The mixture was cooled down to room temperature and 0.6 g of anhydrous sodium acetate were added. After 30 minutes under stirring, the mixture was filtered and the excess of petroleum ether and acetone removed by distillation at reduced pressure. After a further filtration, a clear low viscosity protected mixture comprising tetraol-ketal was isolated (297 g) and analyzed by NMR.

$^1$H NMR (A113/CD$_3$OD) CH$_3$ 1.32 and 1.37 ppm (6H); a complex pattern of signal at 3.5-4.3 ppm (about 7H) due to other protons (the complexity is originated by the presence of the cyclic ketal witch contains a stereogenic center).

Step 1.2: Esterification with a PFPE Diacid

Step 1.2a): Preparation of Acyl Chloride Derivative of a PFPE Diacid

In a four-necked 500 ml flask, equipped with a mechanical stirrer and a dropping funnel, 152 g (1.28 moles) of thionyl chloride and 5 ml of pyridine were heated at 60° C. under stirring. Then 420 g (0.21 moles) of a (per)fluoropolyether diacid having linear structure and carboxylic acid end group of $M_n$=2000 (Z-DIAL), complying with formula:

HO—C(O)CF$_2$O—(CF$_2$CF$_2$O)$_p$—(CF$_2$O)$_q$—CF$_2$C(O)—OH with p/q being 1.0, units being statistically distributed along the chain, were added drop-wise. Evolution of HCl and SO$_2$ was observed. The reaction mixture was stirred at 60° C. for 4 hours, then cooled at room temperature. The heavy fluorinated phase was separated and dried at reduced pressure at 60° C. A low viscous clear liquid (404 g) was obtained.

The $^{19}$F-NMR analysis confirmed quantitative acylation of the diacid Z-DIAC, as monitored by the pre-terminal shift. IR analysis further confirmed the fully conversion of the fluorinated reagent so as to yield the corresponding PFPE-diacyl chloride.

$^{19}$F NMR spectrum (neat simple), diagnostic signals:
of Z DIAC $M_n$=2000: —CF$_2$COOH –80.2 and –78.4 ppm
of PFPE acyl chloride: —CF$_2$COCl –79 and –77.4 ppm Typical IR Band
of Z DIAC $M_n$=2000: 1780 cm$^{-1}$ (carbonyl stretching);
of PFPE acyl chloride: 1801 cm$^{-1}$ (carbonyl stretching).

Step 1.2b): PFPE-Esterification

In a three-necked 500 ml flask, equipped with a mechanical stirrer and a dropping funnel, 250 g of the product obtained in the step 1 (containing 0.06 moles of free OH groups) and 16 g (0.123 moles) of N-ethyldiisopropylamine were introduced under nitrogen. The PFPE-diacyl chloride (60 g, 0.03 mol) from step 2a) was then added over a period of 1 hour at 40° C., and allowed to react for 1 hour at 80° C.

The reaction product, recovered after distillation under reduced pressure of the excess of amine and filtration of ammonium salts, was a viscous light yellow liquid, which was characterized by IR and $^{19}$F NMR analysis. Both techniques confirmed the formation of the expected fully esterified derivatives.

IR band at 1810 cm$^{-1}$ (carbonyl stretching).

$^{19}$F NMR spectrum (neat simple), diagnostic signals: —C$\overline{F_2}$CH$_2$OC(O)— –79.5 and –77.5 ppm —CF$_2$COOCH$_n$— ($\overline{n=1}$ or 2) –79 and –77 ppm This corresponds to the following average composition:
tetraol protected as ketal having <$M_n$>=2000: 47% w/w
esters between acyl chloride and PFPE macromolecules containing a —CF$_2$CH$_2$OH and/or —CF$_2$CH$_2$O—CH$_2$CH(OH)—CH$_2$O—CH$_2$—CH(OH)—CH$_2$OH end group with ketal protected vicinal hydroxyls, having <$M_n$>=6000; 53% w/w Step 1.3: Thin Film Distillation of the Product Obtained in the Step 2

214 g of the product obtained in the step 2 were purified in a thin film distiller at 250° C. at 8×10$^{-3}$ mBar. Two fractions were collected, a heavy residue (56% wt) and a light fraction (44% wt). The IR and NMR analysis of the distilled light fraction confirmed that the isolated product is the protected tetraol derivate that didn't undergo esterification (<1%). IR analysis showed absence of the ester peak at 1810 cm$^{-1}$. $^{19}$F NMR spectrum (neat simple) diagnostic signals:
—C$\overline{F_2}$CH$_2$OCH$_2$— –79.5 and –77.7 ppm
$^1$H NMR (A113/CD$_3$OD), diagnostic signals:
CH$_3$ 1.32 and 1.37 ppm (6H); a complex pattern of signal at 3.5-4.3 ppm (about 7 H).

Complementary analysis of the residue was fully consistent with the analysis of the distilled fraction, the residue containing the ester between acyl chloride and PFPE macromolecules containing —CF$_2$CH$_2$OH and/or bis adduct hemiprotected end groups, and showing IR band at 1810 cm$^{-1}$.

$^{19}$F NMR spectrum (neat simple), diagnostic signals:
—C$\overline{F_2}$CH$_2$OC(O)— –79.5 and –77.5 ppm
—CF$_2$COOCH$_n$— (n=1 or 2) –79 and –77 ppm Step 1.4: Deprotect/on of Tetraol-Ketal The light fraction consisting of tetraol ketal (107 g) was treated at 60° C. for 4 hours with methanol (50 ml) and 20 g of 7%$_{wt}$ HCl aqueous solution. Final product analysis (significant signals):

$^1$H-NMR on derivatized compound with trifluoroacetic anhydride (see above):
5.7 ppm —CH— group of R$_f$CF$_2$CH$_2$OCH$_2$CH(OCOCF$_3$)C$\overline{H}_2$OCOCF$_3$;
No signal at 5.0 and 5.4 ppm (peaks due to the bis-adduct and/or —CF$_2$ CH$_2$OH);
3.7-4.8 signals of other —CH$_2$— groups
The overall recovery yield of the pure tetraol was found to be 94%, while purity of said tetraol was 99%.

EXAMPLE 2

Tetraol 2000 Broad MWD+Diac 2000

Analysis of Raw Mixture ($M_2$)

A mixture ($M_2$) was submitted to NMR analysis as such and after derivatization with trifluoroacetic anhydride, as detailed in example 1.

The analysis yielded the following composition for mixture ($M_2$):
12% end groups of formula —CF$_2$CH$_2$OH
12% end groups of formula —CF$_2$CH$_2$O—CH$_2$CH(OH)—CH$_2$O—CH$_2$—CH(OH)—CH$_2$OH (bis-adduct);
76% end groups of formula —CF$_2$CH$_2$O—CH$_2$CH(OH)—CH$_2$OH.

Its other relevant molecular parameters, as determined by GPC analysis are: average molecular weight=2000, Polydispersity 1.45.

Step 2.1: Protection of Vicinal Hydroxyl Groups

Same procedure as detailed in step 1.1 (ex. 1) was followed, but using 600 g (0.30 moles) of mixture ($M_2$), 220 g (280 ml, 3.8 moles) of acetone, 280 ml of petroleum ether and 0.24 g of sulphuric acid, as well as 1.2 g of sodium acetate. 590 g of protected ketal mixture were isolated and characterized.

Step 2.2: Esterification with a PFPE Diacid

Step 2.2a): Preparation of Acyl Chloride Derivative of a PFPE Diacid

Same procedure as detailed in step 1.2a) were followed, but using 840 g of same Z-DIAL perfluoropolyether diacid derivative, 300 g (2.55 moles) of thionyl chloride and 10 ml of pyridine. 808 g of Z-DIAL acyl chloride derivative were obtained and characterized by NMR and IR spectroscopy.

Step 2.2b): PFPE-Esterification

Same procedure as detailed in step 1.2b) (Ex. 1) was followed, but using 500 g of the product from step 2.1 (containing 0.12 moles of free OH groups), 32 g (0.245 moles) of N-Ethyldiisopropylamine and 120 g (0.06 mol) of Z-DIAL acyl chloride from step 2.2a).

A viscous light yellow liquid (588 g) was isolated and found to have the following composition by IR and $^{19}$F-NMR analysis:

tetraol protected as ketal having $<M_n>=2000$: 47% w/w esters between acyl chloride and PFPE macromolecules containing a —$CF_2CH_2OH$ and/or —$CF_2CH_2O$—$CH_2CH$(OH)—$CH_2O$—$CH_2$—$CH(OH)$—$CH_2OH$ end group with ketal protected vicinal hydroxyls, having $<M_n>=6000$; 53% w/w.

Step 2.3: Thin Film Distillation of the Product Obtained in the Step 2.2

428 g of the product obtained in the step 2.2 were purified in a thin film distiller at 250° C. at $7\times10^{-3}$ mBar. Two fractions were collected, a heavy residue (58% weight) and a light fraction (42%). The IR and NMR analysis of the distilled light fraction confirmed that the isolated product is the protected tetraol derivative that didn't undergo esterification (<1%) via same characteristic absorption bands/peaks as detailed in step 1.3.

Step 2.4: Deprotection of Tetraol-Ketal

Same procedure as detailed in step 1.4 was applied to 108 g of light fraction from step 2.3, obtaining 100 g of pure tetraol, whose structure was confirmed by $^{19}$F-NMR analysis, as detailed in 1.4 here above. The overall recovery yield of the pure tetraol was found to be 89%, while purity of said tetraol was 99%.

EXAMPLE 3

Tetraol 1000 Narrow MWD+Diac 2000

Analysis of Raw Mixture ($M_3$)

A mixture ($M_3$) was submitted to NMR analysis as such and after derivatization with trifluoroacetic anhydride, as detailed in example 1. The analysis yielded the following composition for mixture ($M_3$):

10% end groups of formula —$CF_2CH_2OH$

14% end groups of formula —$CF_2CH_2O$—$H_2CH(OH)$—$CH_2O$—$CH_2$—$CH(OH)$—$CH_2OH$ (bis-adduct);

76% end groups of formula —$CF_2CH_2O$—$CH_2CH$(OH)—$CH_2OH$.

Its other relevant molecular parameters, as determined by GPC analysis are: average molecular weight=1000, Polydispersity 1.08.

Step 3.1: Protection of Vicinal Hydroxyl Groups

Same procedure as detailed in step 1.1 (ex. 1) was followed, but using 300 g (0.30 moles) of mixture ($M_3$), 220 g (280 ml, 3.8 moles) of acetone, 280 ml of petroleum ether and 0.24 g of sulphuric acid, as well as 1.2 g of sodium acetate. 320 g of protected ketal mixture were isolated and characterized.

Step 3.2: Esterification with a PFPE Diacid

Step 3.2a): Preparation of Acyl Chloride Derivative of a PFPE Diacid

An aliquot of the Z-DIAL acyl chloride from step 2.2a) was used.

Step 3.2b): PFPE-Esterification

Same procedure as detailed in step 1.2b) (Ex. 1) was followed, but using 250 g of the product from step 3.1 (containing 0.12 moles of free OH groups), 32 g (0.245 moles) of N-Ethyldiisopropylamine and 120 g (0.06 mol) of Z-DIAC acyl chloride from step 2.2a).

A viscous light yellow liquid (351 g) was isolated and found to have the following composition by IR and $^{19}$F-NMR analysis tetraol protected as ketal having $<M_n>=1000$: 37% w/w esters between acyl chloride and PFPE macromolecules containing a —$CF_2CH_2OH$ and/or —$CF_2CH_2O$—$CH_2CH$(OH)—$CH_2O$—$CH_2$—$CH(OH)$—$CH_2OH$ end group with ketal protected vicinal hydroxyls, having $<M_n>=4000$; 63% w/w.

Step 3.3: Thin Film Distillation of the Product Obtained in the Step 3.2

319 g of the product obtained in the step 3.2 were purified in a thin film distiller at 200° C. at $7\times10^{-3}$ mBar. Two fractions were collected, a heavy residue (67% weight) and a light fraction (33%). The IR and NMR analysis of the distilled light fraction confirmed that the isolated product is the protected tetraol derivative that didn't undergo esterification (<1%) via same characteristic absorption bands/peaks as detailed in step 1.3.

Step 3.4: Deprotection of Tetraol-Ketal

Same procedure as detailed in step 1.4 was applied to 58 g of light fraction from step 3.3, obtaining 50 g of pure tetraol, whose structure was confirmed by $^{19}$F-NMR analysis, as detailed in 1.4 here above. The overall recovery yield of the pure tetraol was found to be 88.7%, while purity of said tetraol was 99%.

EXAMPLE 4

Tetraol 2000 Narrow MWD+Dodecandioic Acid Acyl Chloride

Analysis of Raw Mixture ($M_1$)

Same mixture ($M_1$) of example 1 was used.

Step 4.1: Protection of Vicinal Hydroxyl Groups

Vicinal groups in mixture (M1) were protected following procedure detailed in step 1.1 (Ex. 1).

Step 4.2: Esterification with a Fatty Diacid

Step 4.2a): Preparation of Acyl Chloride Derivative of Dodecandioic Acid

Same procedure as detailed in step 1.2a) were followed, but using 51.6 g (0.43 moles) of thionyl chloride, 1 ml of pyridine, and 28 g (0.12 moles) of dodecandioic acid of formula: HO—C(O)—$(CH_2)_{10}$—C(O)—OH.

A low viscous dark liquid (32 g) was obtained, which was found to be by IR analysis corresponding diacyl chloride derivative. IR band of:

acid moieties: 1710 cm$^{-1}$ (carbonyl stretching);

acyl chloride moieties: 1800 cm$^{-1}$ (carbonyl stretching).

Step 4.2b): PFPE-Esterification

Same procedure as detailed in step 1.2b) (Ex. 1) was followed, but using 400 g of the product from step 4.1 (containing 0.1 moles of free OH groups), 16 g (0.123 moles) of N-Ethyldiisopropylamine and 100 g (0.05 mol) of the diacyl chloride from step 4.2a).

A viscous light yellow liquid was isolated and found to have the following composition by IR (band at 1810 cm$^{-1}$) and $^1$H-NMR analysis:

tetraol protected as ketal having $<M_n>=2000$: 61% w/w;

esters between acyl chloride and PFPE macromolecules containing a —$CF_2CH_2OH$ and/or —$CF_2CH_2O$—$CH_2CH$(OH)—$CH_2O$—$CH_2$—$CH(OH)$—$CH_2OH$ end group with ketal protected vicinal hydroxyls, having $<M_n>=4300$; 39% w/w.

Step 4.3: Thin Film Distillation of the Product Obtained in the Step 4.2

360 g of the product obtained in the step 4.2 were purified in a thin film distiller at 250° C. at $8\times10^{-3}$ mBar. Two fractions were collected, a heavy residue (44% weight) and a light fraction (56%). The IR and NMR analysis of the distilled light fraction confirmed that the isolated product is the protected tetraol derivative that didn't undergo esterification (<1%) via same characteristic absorption bands/peaks as detailed in step 1.3.

Step 4.4: Deprotection of Tetraol-Ketal

Same procedure as detailed in step 1.4 was applied to 107 g of light fraction from step 4.3, obtaining 100 g of pure tetraol, whose structure was confirmed by $^{19}$F-NMR analysis, as detailed in 1.4 here above. The overall recovery yield of the pure tetraol was found to be 90%, while purity of said tetraol was 99%.

EXAMPLE 5

Tetraol 1000 Narrow MWD+Diac 1000

Analysis of Raw Mixture ($M_5$)

A mixture ($M_5$) was submitted to NMR analysis as such and after derivatization with trifluoroacetic anhydride, as detailed in example 1. The analysis yielded the following composition for mixture ($M_5$):

14% end groups of formula —$CF_2CH_2OH$
10% end groups of formula —$CF_2CH_2O$—$CH_2CH$(OH)—$CH_2O$—$CH_2CH(OH)$—$CH_2OH$ (bis-adduct);
76% end groups of formula —$CF_2CH_2O$—$CH_2CH$(OH)—$CH_2OH$.

Its other relevant molecular parameters, as determined by GPC analysis are: average molecular weight=1000, Polydispersity 1.10.

Step 5.1: Protection of Vicinal Hydroxyl Groups

Same procedure as detailed in step 1.1 (ex. 1) was followed, but using 150 g (0.30 moles) of mixture ($M_5$), 110 g (140 ml, 1.9 moles) of acetone, 140 ml of petroleum ether and 0.12 g of sulphuric acid, as well as 0.6 g of sodium acetate. 160 g of protected ketal mixture were isolated and characterized.

Step 5.2a): Preparation of Acyl Chloride Derivative of a PFPE Diacid

Same procedure as detailed in step 1.2a) were followed, but using 210 g of Z-DIAL perfluoropolyether diacid having linear structure and carboxylic acid end group of $M_n$=1000 (Z-DIAL), complying with formula:

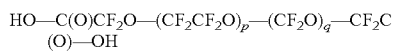

with p/q being 1.0, 125 g (1.28 moles) of thionyl chloride and 5 ml of pyridine. 201 g of Z-DIAL acyl chloride derivative were obtained and characterized by NMR and IR spectroscopy.

Step 5.2b): PFPE-Esterification

Same procedure as detailed in step 1.2b) was followed, but using 125 g of the product from step 5.1 (containing 0.06 moles of free OH groups), 16 g (0.123 moles) of N-Ethyldiisopropylamine and 30 g (0.03 mol) of Z-DIAL acyl chloride from step 5.2a).

A viscous light yellow liquid (142 g) was isolated and found to have the following composition by IR and $^{19}$F-NMR analysis:

tetraol protected as ketal having <$M_n$>=1000: 47% w/w
esters between acyl chloride and PFPE macromolecules containing a —$CF_2CH_2OH$ and/or —$CF_2CH_2O$—$CH_2CH$(OH)—$CH_2O$—$CH_2$—$CH(OH)$—$CH_2OH$ end group with ketal protected vicinal hydroxyls, having <$M_n$>=3000; 53% w/w.

Step 5.3: Thin Film Distillation of the Product Obtained in the Step 5.2

100 g of the product obtained in the step 5.2 were purified in a thin film distiller at 190° C. at $8\times10^{-3}$ mBar. Two fractions were collected, a heavy residue (56% weight) and a light fraction (44%). The IR and NMR analysis of the distilled light fraction confirmed that the isolated product is the protected tetraol derivative that didn't undergo esterification (<1%) via same characteristic absorption bands/peaks as detailed in step 1.3.

Step 5.4: Deprotection of Tetraol-Ketal

Same procedure as detailed in step 1.4 was applied to 47 g of light fraction from step 5.3, obtaining 43 g of pure tetraol, whose structure was confirmed by $^{19}$F-NMR analysis, as detailed in 1.4 here above. The overall recovery yield of the pure tetraol was found to be 93.6%, while purity of said tetraol was 99%.

EXAMPLE 6

Tetraol 1000 Narrow MWD+Isostearic Acid Acyl Chloride

Analysis of Raw Mixture ($M_6$)

A mixture ($M_6$) was submitted to NMR analysis as such and after derivatization with trifluoroacetic anhydride, as detailed in example 1. The analysis yielded the following composition for mixture ($M_6$):

8% end groups of formula —$CF_2CH_2OH$
16% end groups of formula —$CF_2CH_2O$—$CH_2CH$(OH)—$CH_2O$—$CH_2CH(OH)$—$CH_2OH$ (bis-adduct);
76% end groups of formula —$CF_2CH_2O$—$CH_2CH$(OH)—$CH_2OH$.

Its other relevant molecular parameters, as determined by GPC analysis are: average molecular weight=1000, Polydispersity 1.07.

Step 6.1: Protection of Vicinal Hydroxyl Groups

Vicinal groups in mixture ($M_6$) were protected following procedure detailed in step 1.1 (Ex. 1), using 150 g of mixture ($M_6$), 110 g (140 ml, 1.9 moles) of acetone, 140 ml of low boiling petroleum ether and 0.12 g sulphuric acid.

147 g of clear viscous ketal derivative were obtained whose structure was confirmed by NMR analysis.

Step 6.2: Esterification with a Fatty Acid

Step 6.2a): Preparation of Acyl Chloride Derivative of Isostearic Acid

Same procedure as detailed in step 1.2a) were followed, but using 152 g (1.28 moles) of thionyl chloride, 5 ml of pyridine, and 59.7 g (0.21 moles) of isostearic acid of formula: $(H_3C)_2CH(CH_2)_{14}$—C(O)—OH.

A low viscous dark liquid (63.1 g) was obtained, which was found to be by IR analysis corresponding acyl chloride derivative. IR showed following absorption bands:
acid moieties: 1720 cm$^{-1}$ (carbonyl stretching);
acyl chloride moieties: 1800 cm$^{-1}$ (carbonyl stretching).

Step 6.2b): PFPE-Esterification

Same procedure as detailed in step 1.2b) was followed, but using 125 g of the product from step 6.1 (containing 0.06 moles of free OH groups), 16 g (0.123 moles) of N-Ethyldiisopropylamine and 18 g (0.05 mol) of the acyl chloride from step 6.2a).

A slightly viscous light yellow liquid was isolated and found to have the following composition by IR (band at 1810 cm$^{-1}$) and $^1$H-NMR analysis:

tetraol protected as ketal having $<M_n>=1000$: 52% w/w;

esters between isostearic acyl chloride and PFPE macromolecules containing a —$CF_2CH_2OH$ and/or —$CF_2CH_2O$—$CH_2CH(OH)$—$CH_2O$—$CH_2$—$CH(OH)$—$CH_2OH$ end group with ketal protected vicinal hydroxyls, having $<M_n>=1300$; 48% w/w.

Step 6.3: Thin Film Distillation of the Product Obtained in the Step 6.2

107 g of the product obtained in the step 6.2 were purified in a thin film distiller at 180° C. at $6\times10^{-3}$ mBar. Two fractions were collected, a heavy residue (53% weight) and a light fraction (47%). The IR and NMR analysis of the distilled light fraction confirmed that the isolated product is the protected tetraol derivative that didn't undergo esterification (<1%) via same characteristic absorption bands/peaks as detailed in step 1.3.

Step 6.4: Deprotection of Tetraol-Ketal

Same procedure as detailed in step 1.4 was applied to 37 g of light fraction from step 6.3, obtaining 33 g of pure tetraol, whose structure was confirmed by $^{19}$F-NMR analysis, as detailed in 1.4 here above. The overall recovery yield of the pure tetraol was found to be 90%, while purity of said tetraol was 99%.

EXAMPLE 7

Tetraol 1000 Narrow MWD+Krytox® 3000

Raw Mixture ($M_6$)

Same mixture ($M_6$) whose properties are detailed herein above in Ex. 6 was employed.

Step 7.1: Protection of Vicinal Hydroxyl Groups

Protected ketal mixture obtained from mixture ($M_6$) as detailed in section 6.1 was used.

Step 7.2: Esterification with a PFPE Diacid

Step 7.2b): PFPE-Esterification

Same procedure as detailed in step 1.2b) (Ex. 1) was followed, but using 125 g of the product from step 6.1 (containing 0.06 moles of free OH groups), 16 g (0.123 moles) of N-Ethyldiisopropylamine and 180 g (0.06 moles) of KRYTOX® perfluoropolyether acyl fluoride (commercially available from DuPont) of formula $CF_3CF_2CF_2O$—$(CF(CF_3)$—$CF_2O)_n$—$CF(CF_3)$—$C(O)F$, with n being an integer such that the average molecular weight is 3000.

A viscous light yellow liquid (274 g) was isolated and found to have the following composition by IR and $^{19}$F-NMR analysis:

tetraol protected as ketal having $<M_n>=1000$: 25.5% w/w esters between KRYTOX® acyl fluoride and PFPE macromolecules containing a —$CF_2CH_2OH$ and/or —$CF_2CH_2O$—$CH_2CH(OH)$—$CH_2O$—$CH_2$—$CH(OH)$—$CH_2OH$ end group with ketal protected vicinal hydroxyls, having $<M_n>=4000$: 74.5% w/w.

Step 7.3: Thin Film Distillation of the Product Obtained in the Step 7.2

214 g of the product obtained in the step 7.2 were purified in a thin film distiller at 180° C. at $6\times10^{-3}$ mBar. Two fractions were collected, a heavy residue (25% weight) and a light fraction (75%). The IR and NMR analysis of the distilled light fraction confirmed that the isolated product is the protected tetraol derivative that didn't undergo esterification (<1%) via same characteristic absorption bands/peaks as detailed in step 1.3.

Step 7.4: Deprotection of Tetraol-Ketal

Same procedure as detailed in step 1.4 was applied to 50 g of light fraction from step 7.3, obtaining 44.5 g of pure tetraol, whose structure was confirmed by $^{19}$F-NMR analysis, as detailed in 1.4 here above. The overall recovery yield of the pure tetraol was found to be 98%, while purity of said tetraol was 99%.

The invention claimed is:

1. A process for the purification of a tetraol PFPE derivative [tetraol (T)] of formula (I):

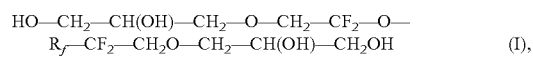

$HO$—$CH_2$—$CH(OH)$—$CH_2$—$O$—$CH_2$—$CF_2$—$O$—$R_f$—$CF_2$—$CH_2O$—$CH_2$—$CH(OH)$—$CH_2OH$    (I), wherein $R_f$ represents a fluoropolyoxyalkene chain (chain $R_f$), said chain $R_f$ being a fluorocarbon segment comprising ether linkages in main chain, from a mixture of hydroxyl (per)fluoropolyether derivatives [mixture (M)], said mixture comprising said tetraol (T) and at least one hydroxyl (per)fluoropolyether [PFPE (OH)] comprising a chain $R_f$ terminated with at least one end group of formula:

—$CF_2CH_2OH$; or —$CF_2CH_2O$—$CH(OH)$—$CH_2$—$O$—$CH_2$—$CH(OH)$—$CH_2OH$;

said process comprising:

step 1: reacting the mixture (M) with ketones and/or aldehydes so as to selectively protect couples of hydroxyl groups on vicinal carbon atoms by forming corresponding cyclic ketal/acetal derivatives, so as to yield a protected mixture [mixture (P)];

step 2: reacting residual hydroxyl groups of the mixture (P) with suitable functionalizing agents enabling substantial volatility modification, so as to obtain a functionalized protected mixture [mixture ($P_f$)];

step 3: fractional distillation of the mixture ($P_f$) so as to isolate the cyclic acetal/ketal derivatives of tetraol (T);

step 4: hydrolyzing the acetal/ketal derivatives of tetraol (T) so as to recover pure tetraol (T).

2. The process according to claim 1, wherein said mixture (M) comprises a mixture of hydroxyl (per)fluoropolyether derivative(s) and tetraol (T) complying with formula:

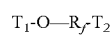

$T_1$-$O$—$R_f$-$T_2$ wherein:

$R_f$ is the fluoropolyoxyalkene chain; and $T_1$ and $T_2$ are selected from the grow consisting of:

(t1) —$CF_2$—$CH_2O$—$CH_2$—$CH(OH)$—$CH_2OH$;

(t2) —$CF_2CH_2OH$; and (t3) —$CF_2$—$CH_2O$—$CH(OH)$—$CH_2$—$O$—$CH_2$—$CH(OH)$—$CH_2OH$, with the proviso that the mixture (M) comprises at least one compound wherein $T_1=T_2=t1$ and at least one hydroxyl (per)fluoropolyether with at least one of $T_1$ and $T_2$ different from t1.

3. The process of claim 2, wherein step 1 is carried out by contacting the mixture (M) with an aldehyde or a ketone in the presence of a protic acid.

4. The process of claim 2, wherein groups t1, t2 and t3 yield in step 1 protected or hemi-protected end-groups as detailed in following scheme:

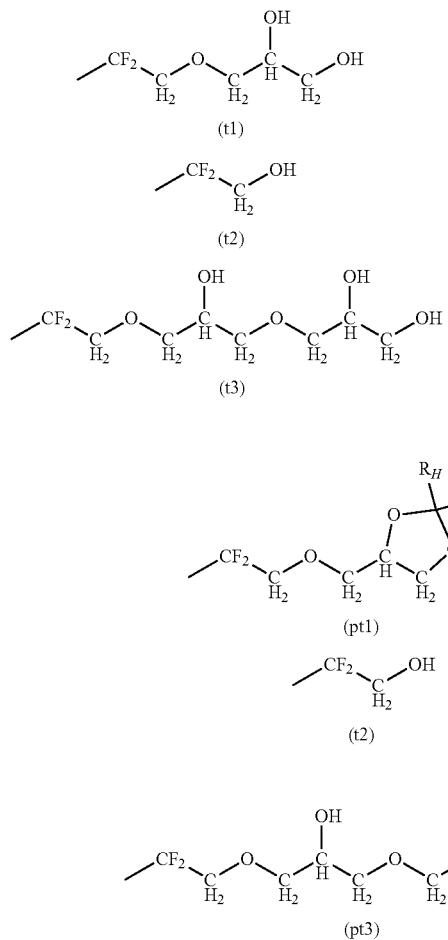

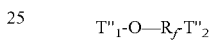

wherein $R_H$ and $R'_H$, equal to or different from each other, are independently selected from the group consisting of H and $C_1$-$C_{12}$ hydrocarbon group, with the proviso that at least one of $R_H$ and $R'_H$ is different from H.

5. The process of claim 4, wherein the protected mixture [mixture (P)] comprises a mixture of at least partially protected hydroxyl (per)fluoropolyether derivatives and protected tetraols (T) complying with formula:

$$T'_1\text{-}O\text{---}R_f\text{-}T'_2$$

wherein:

$R_f$ is the fluoropolyoxyalkene chain; and $T'_1$ and $T'_2$ are selected from the group consisting of:

(pt1)

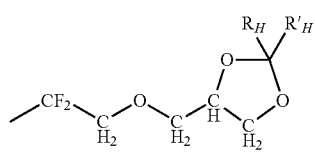

(t2) —CF$_2$CH$_2$OH; and (pt3)

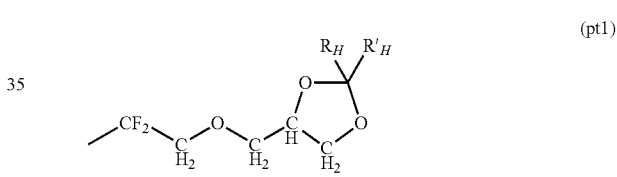

wherein $R_H$ and $R'_H$, equal to or different from each other, are independently selected from the group consisting of H and $C_1$-$C_{12}$ hydrocarbon group, at least one of $R_H$ and $R'_H$ being different from H, with the proviso that the mixture (P) comprises at least one compound wherein $T'_1$=$T'_2$=pt1 and at least one optionally partially protected hydroxyl (per)fluoropolyether with at least one of $T'_1$ and $T'_2$ different from pt1.

6. The process of claim 5, wherein the functionalized protected mixture from step 2 [mixture ($P_f$)] comprises a mixture of functionalized, optionally partially protected, hydroxyl (per)fluoropolyether derivatives and protected tetraols (T) complying with formula:

$$T''_1\text{-}O\text{---}R_f\text{-}T''_2$$

wherein:

$R_f$ is the fluoropolyoxyalkene chain; and $T''_1$ and $T''_2$ are selected from the group consisting of:

(pt1)

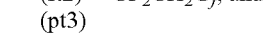

(ft2) —CF$_2$CH$_2$G$_f$; and (pt3)

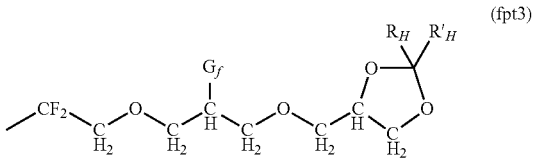

wherein $R_H$ and $R'_H$, equal to or different from each other, are independently selected from the group consisting of H and $C_1$-$C_{12}$ hydrocarbon group, at least one of $R_H$ and $R'_H$ being different from and $G_f$ is a functional group enabling substantial volatility modification, optionally bond at its distal end to another (ft2) or (fpt3) group, with the proviso that the mixture ($P_f$) comprises at least one compound wherein $T''_1$=$T''_2$=pt1 and at least one (per)fluoropolyether with at least one of $T''_1$ and $T''_2$ different from pt1.

7. The process of claim 6, wherein residual hydroxyl groups are functionalized in step 2 by conversion in corresponding esters moieties, via reaction with one or more suitable carbonyl derivatives.

8. The process of claim 7, wherein the one or more carbonyl derivatives are selected among mono-carbonyl derivatives, selected from the group consisting of:

organic fatty acids of formula $R_a$—COOH, with $R_a$ being an aliphatic $C_{8-36}$ group;

(per)fluoropolyether monoacyl derivatives of formula:

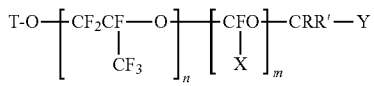

wherein X' is F or $CF_3$; R and R', equal to or different from each other are independently selected from the group consisting of F, Cl, and Br; Y is a —C(O)X group, with X being Cl, F, or OH; T is a $C_1$-$C_3$ perfluorocarbon group, optionally comprising one halogen atom different from fluorine; n ranges from 1 to 25, with m/n being from 0.01 to 0.5, units being statistically distributed along the chain;

(per)fluoropolyether monoacyl derivatives of formula:

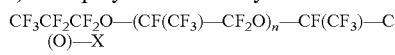

with X being Cl, F, or OH, and n is selected so as the average molecular weight is comprised between 100 and 10,000; and (per)fluoropolyether monoacyl derivatives of formula:

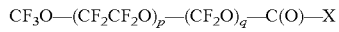

with X being Cl, F, or OH, and p and q are selected so as the average molecular weight is comprised between 100 and 10,000, with p/q being $\geq 0.5$, units being statistically distributed along the chain.

9. The process of claim 7, wherein the one or more carbonyl derivatives are selected among di-carbonyl derivatives, selected from the group consisting of:

organic fatty diacids of formula HOOC—$R_b$—COOH, with $R_b$ being a divalent aliphatic $C_{6-24}$ group;

(per)fluoropolyether diacyl derivatives of formula:

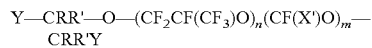

wherein X' is F or $CF_3$; R and R', equal to or different from each other are independently selected from the group consisting of F, Cl, and Br; Y is a —C(O)X group, with X being Cl, F, OH; n ranges from 1 to 25, with m/n being 0.01 to 0.5, recurring units being statistically distributed along the chain; and (per)fluoropolyether diacyl derivatives of formula:

wherein X being Cl, F, OH; p and q are selected so that the average molecular weight is comprised between 100 and 10,000, with p/q being $\geq 0.5$, recurring units being statistically distributed along the chain.

10. The process of claim 8, wherein the mixture ($P_f$) is fractional distilled by thin film distillation.

* * * * *